Jan. 4, 1966 G. DIRKS 3,228,007

MAGNETIC STORAGE DEVICE

Original Filed March 30, 1955 12 Sheets-Sheet 1

INVENTOR
Gerhard Dirks
BY Michael S. Striker
ATTORNEY

Jan. 4, 1966 G. DIRKS 3,228,007

MAGNETIC STORAGE DEVICE

Original Filed March 30, 1955

12 Sheets-Sheet 2

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

Jan. 4, 1966 G. DIRKS 3,228,007

MAGNETIC STORAGE DEVICE

Original Filed March 30, 1955 12 Sheets-Sheet 6

INVENTOR
Gerhard Dirks
BY Michael S. Striker
ATTORNEY

Jan. 4, 1966 G. DIRKS 3,228,007

MAGNETIC STORAGE DEVICE

Original Filed March 30, 1955 12 Sheets-Sheet 7

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

Jan. 4, 1966 G. DIRKS 3,228,007

MAGNETIC STORAGE DEVICE

Original Filed March 30, 1955 12 Sheets-Sheet 11

INVENTOR
Gerhard Dirks

BY Michael S. Striker
ATTORNEY

Jan. 4, 1966 G. DIRKS 3,228,007

MAGNETIC STORAGE DEVICE

Original Filed March 30, 1955 12 Sheets-Sheet 12

INVENTOR
Gerhard Dirks
BY Michael S. Striker
ATTORNEY

United States Patent Office 3,228,007

Patented Jan. 4, 1966

3,228,007

MAGNETIC STORAGE DEVICE

Gerhard Dirks, 12120 Edgecliff Place, Los Altos Hills, Calif.

Continuation of application Ser. No. 498,047, Mar. 30, 1955. This application Apr. 26, 1961, Ser. No. 107,283 Claims priority, application Great Britain, Dec. 23, 1954, 37,214/54; Germany, Oct. 1, 1948, P 11,464
27 Claims. (Cl. 340—172.5)

This application is a continuation application of patent application Serial No. 498,047, now abandoned, filed March 30, 1955, which last-mentioned application is a continuation-in-part of patent application Serial No. 101,032, filed June 24, 1949, and now abandoned.

The invention relates to magnetic storage devices with which the recording, sensing and erasing of signals is effected by signal heads.

A magnetic storage device makes use of a magnetizable record means as a signal carrier, which has or is provided with a magnetizable record material which will record sensable signals by changes of the magnetic state of the said record material.

The present invention provides a selective magnetic storage means comprising a rotation-symmetrical magnetizable signal carrier and signal sensing and/or recording means therefor, with relative cyclic movement between said signal carrier and said means, together with means whereby signals may be transferred selectively to or from the said signal carrier by said means.

The rotation-symmetrical magnetizable signal carrier may be the magnetizable layer or surface of a drum or of a disc or the like. The recording means will include at least one signal head but usually there will be a plurality of signal heads and these will be displaced relatively to each other, for instance axially or circumferentially in the case of a drum, and radially or circumferentially in the case of a disc. In both cases the circumferential distance will be a whole multiple of the extent of displacement between signals heads. A means may be provided whereby signals or groups of signals may be recorded and/or sensed on a basis of locality or on a basis of time.

Sensing means for synchronizing signals may also be provided, and such synchronizing signals may be recorded as remanent or permanent signals on a signal carrier. The synchronizing signals may be magnetizably recorded, or they may be recorded optically or photographically. Additional selecting means may be provided including distributing means operating under the control of such synchronizing signals, and such distributing means may be an electrically actuating or electronically actuating distributing means.

The selecting means for selective transfer of signals between the signal carrier and the sensing or recording means may be adapted for operation in dependence on a selection program of any kind, including those adapted for handling addresses, information, control and/or selection signals and auxiliary or supplementary signals. By such means, it is possible, as explained more fully hereinafter, to consider the magnetizable surface as representing so many punched cards, to select in a manner equivalent to the sorting of punched cards.

One of the special advantages of the selective storage means is the possibility of a combination with computing, printing and/or indicating devices and the like. These selective storages may either contain changeable impulses, which can be sensed, erased and renewed at recording, or may be fixed impulse sequences, containing charts, tables, reference information and the like. The selective storages allow the sensing of any adjusted position of the storage and the transfer of impulses between that position and a computing, printing and/or indicating device and the like, in a fraction of a second.

In order that the invention may be readily carried into effect, it will now be described with reference to the accompanying drawings, wherein.

Figure 3:
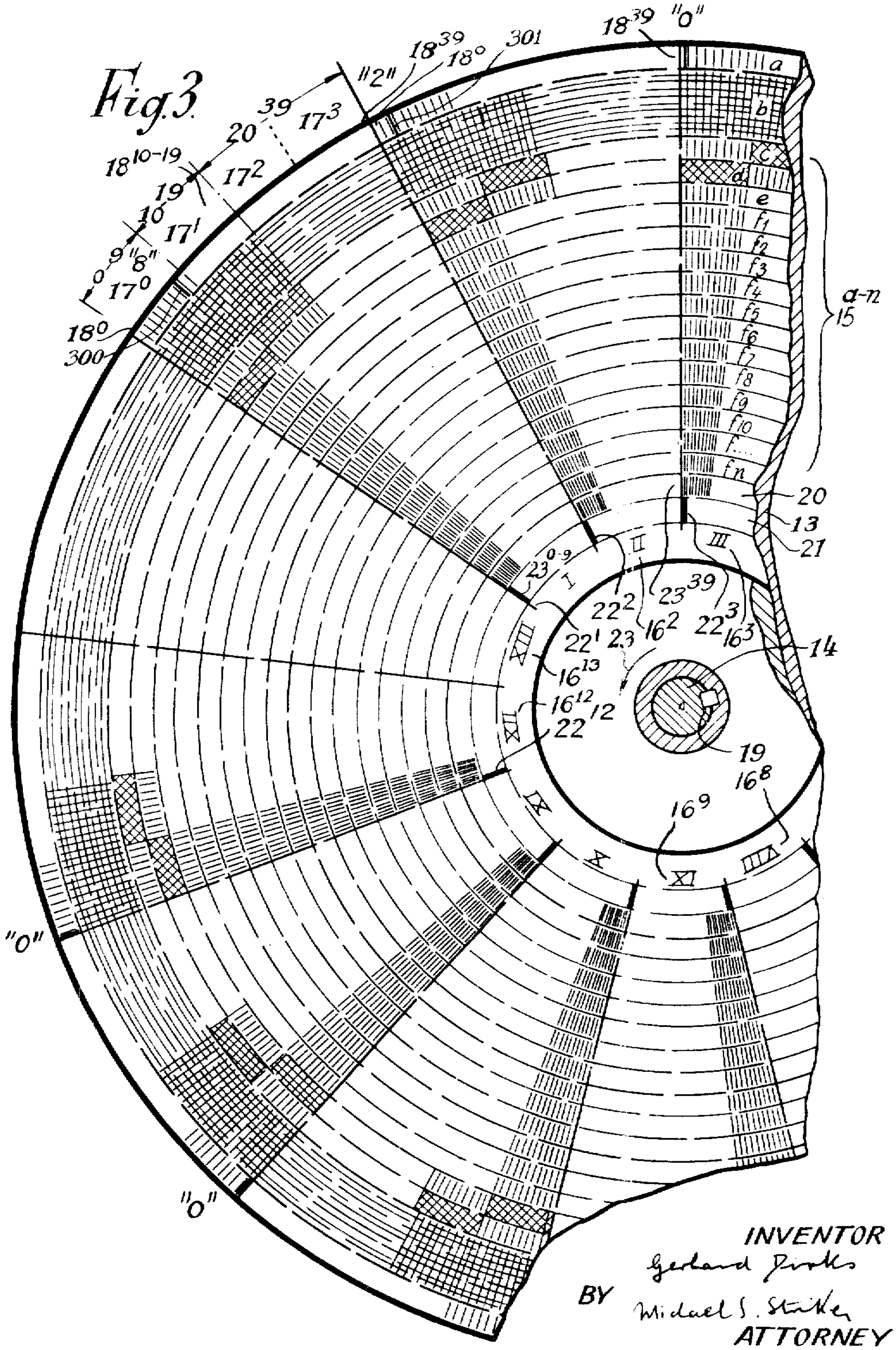
FIG. 3 is a view in axial direction of one half of a magnetic storage disc, formed as a magnetizable signal carrier, the markings shown being purely for the purpose of explanation.
Figures 4A, 4B, 4C:
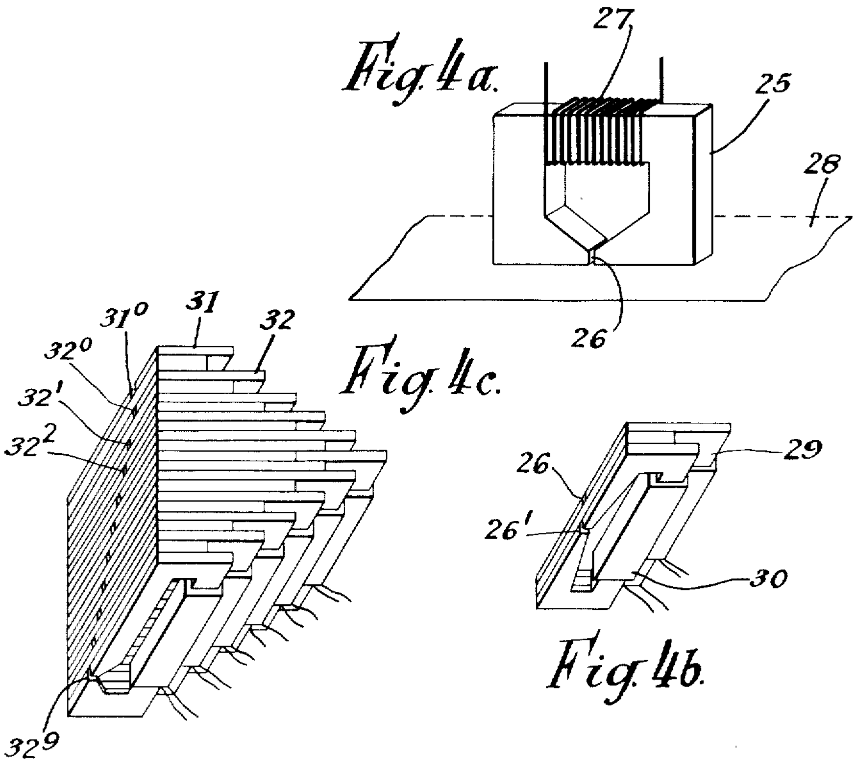
Figures 4D, 4E:
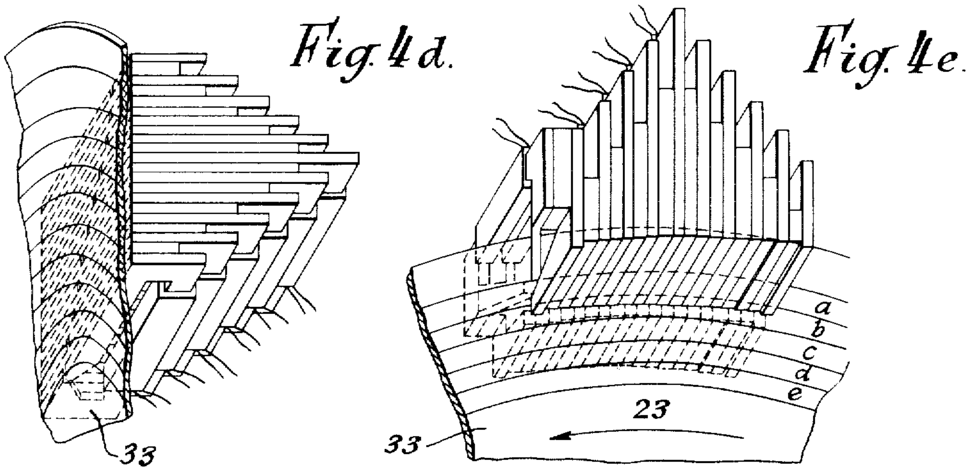
Figures 5A, 5B:
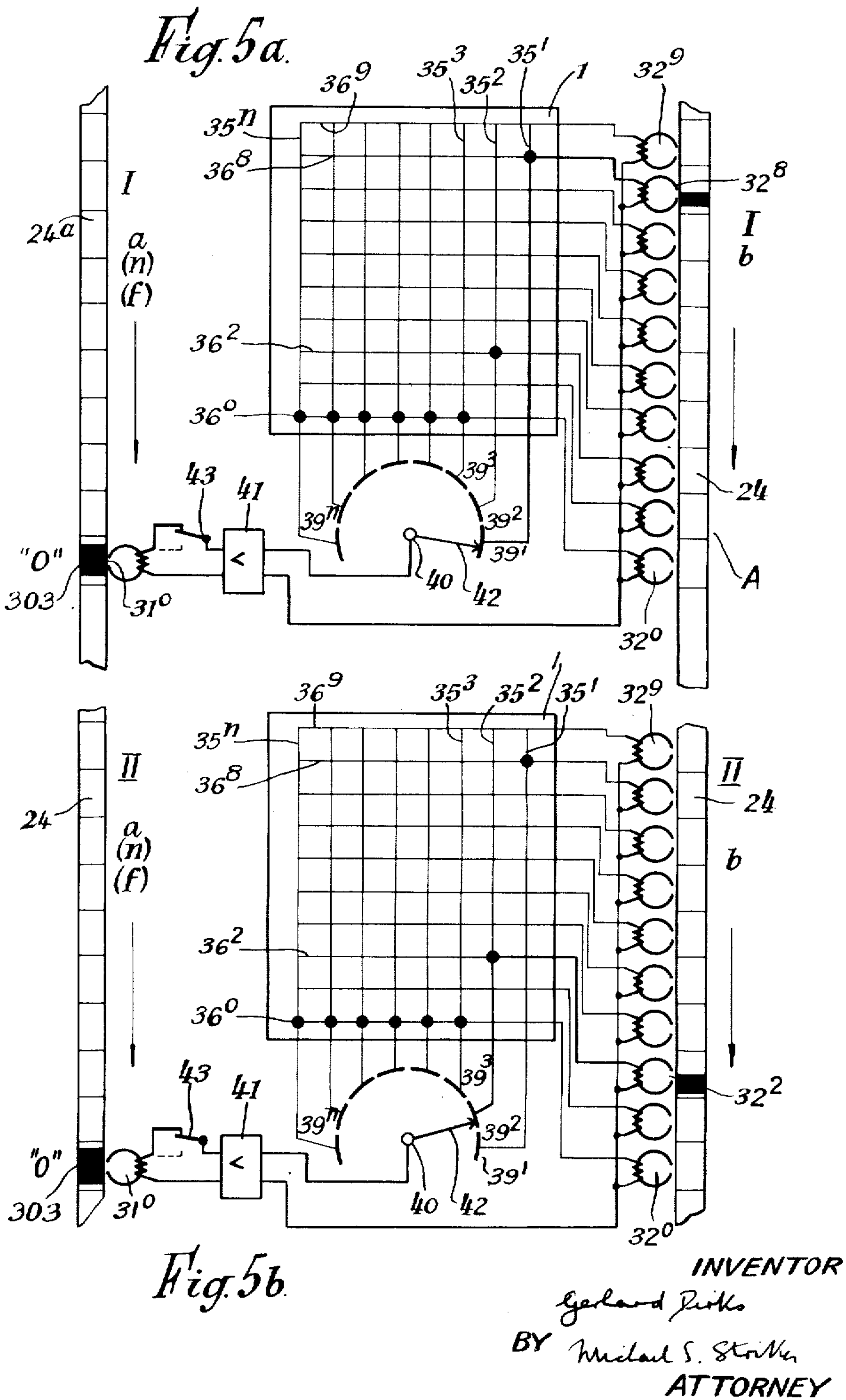
Figures 6A, 6B:
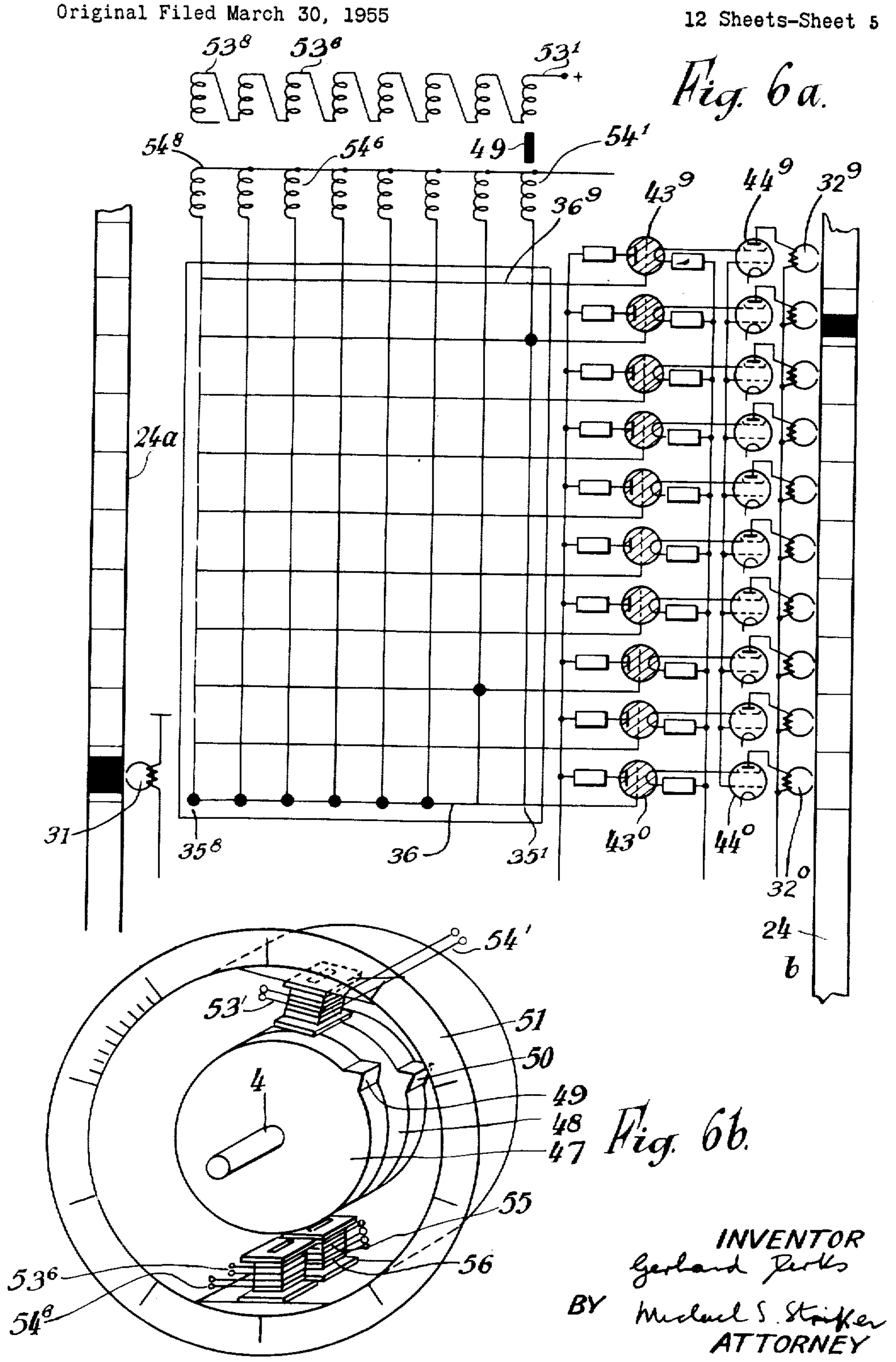
Figure 7:
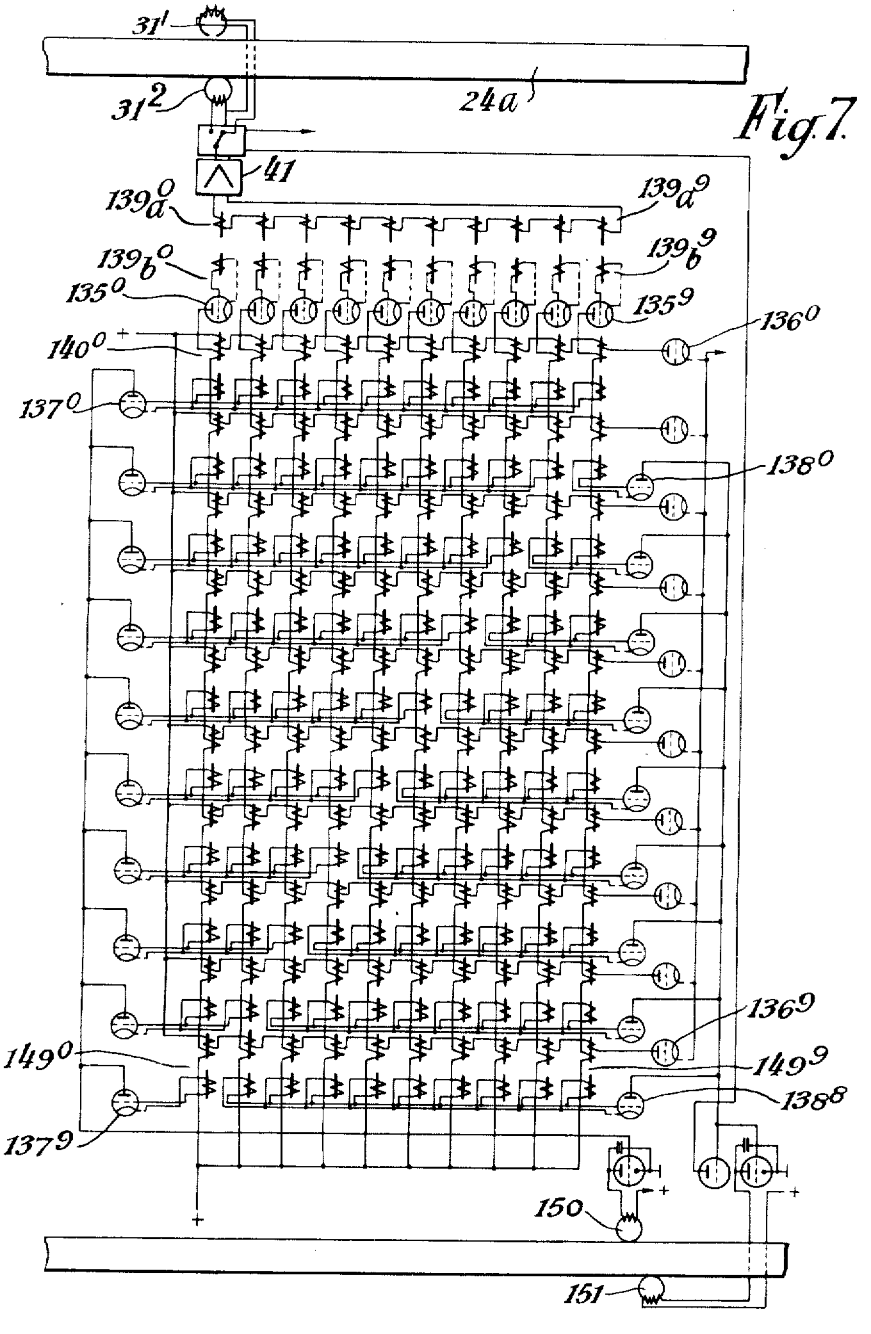
Figure 8:
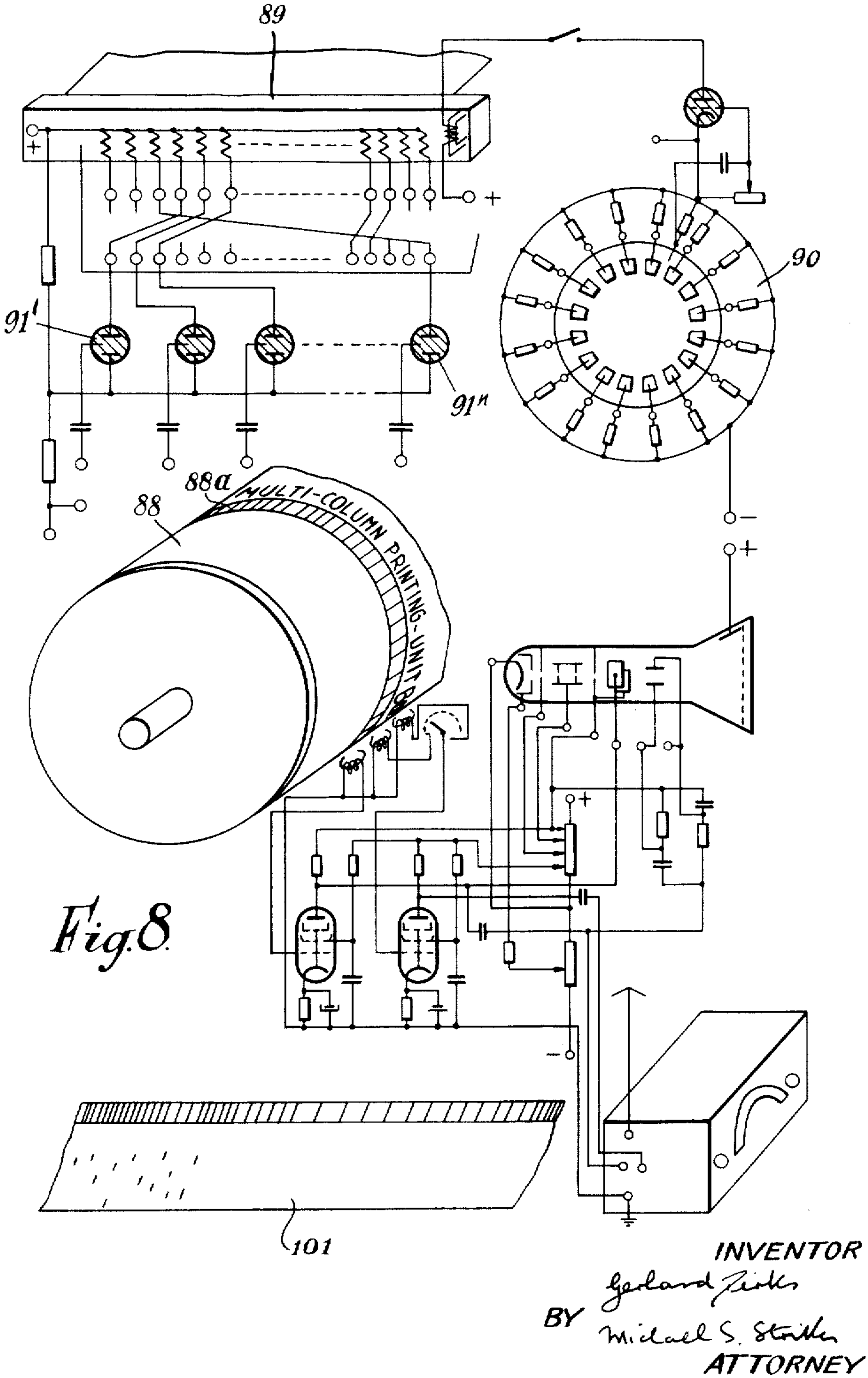
Figures 9, 11B:
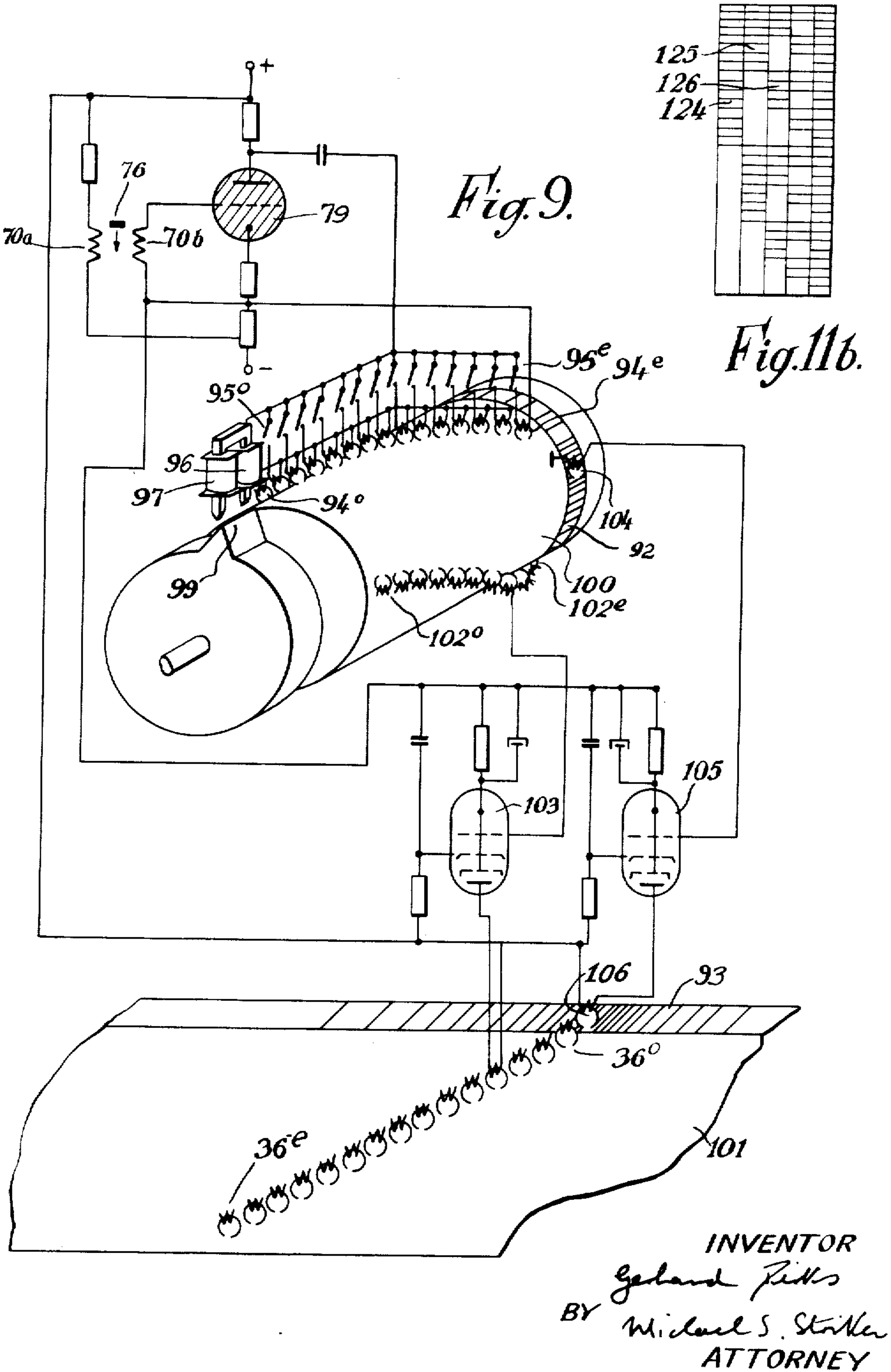
Figure 10A:
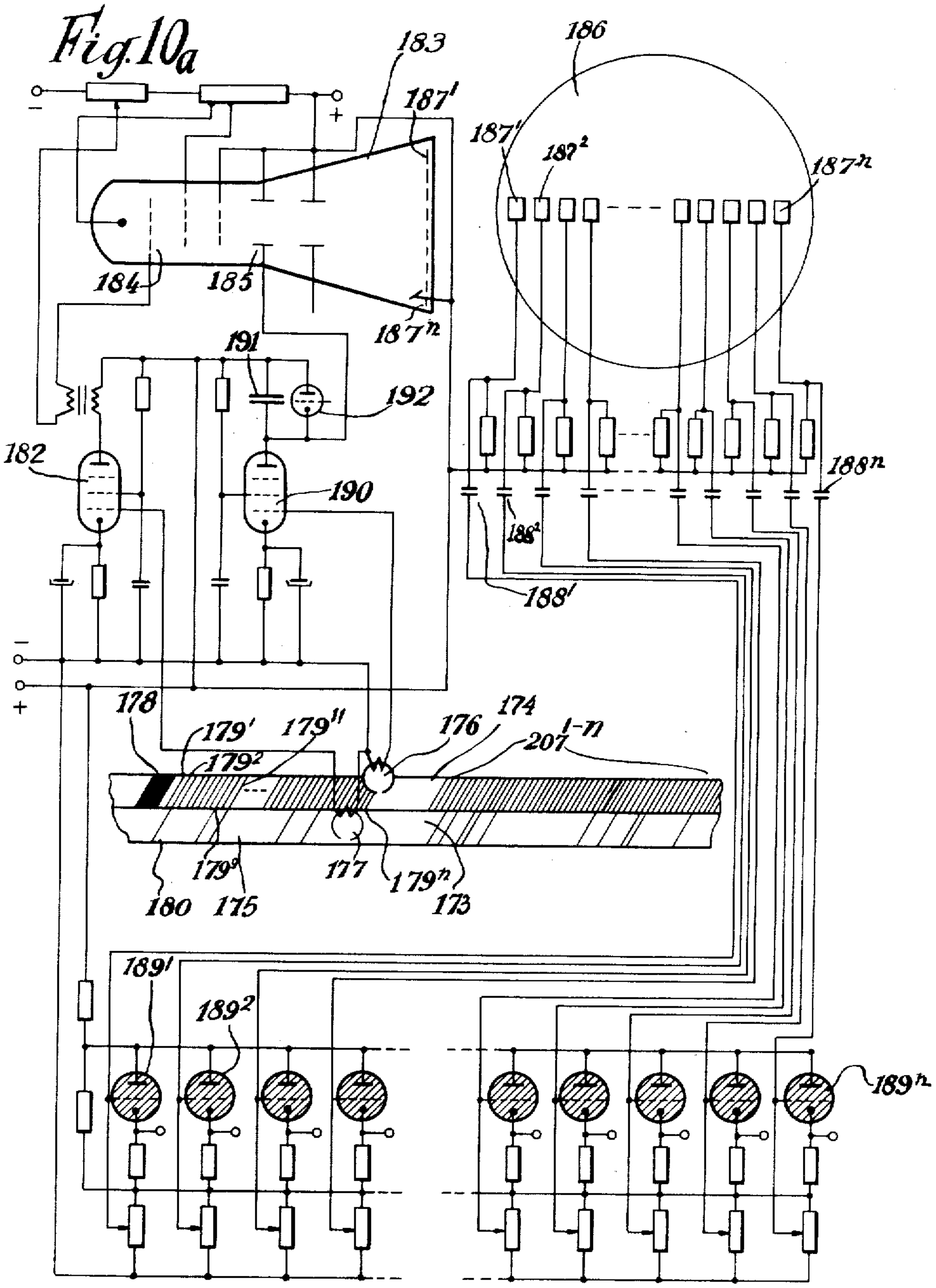
Figure 10B:
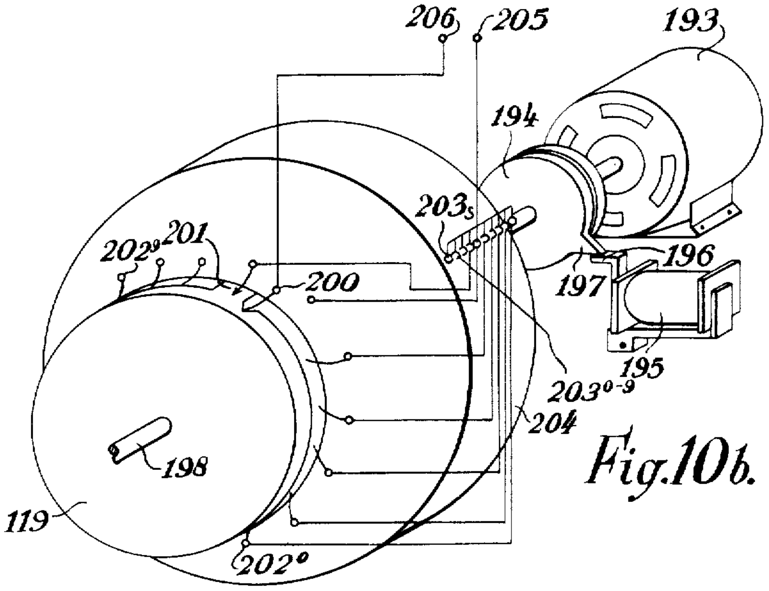
Figure 10C:
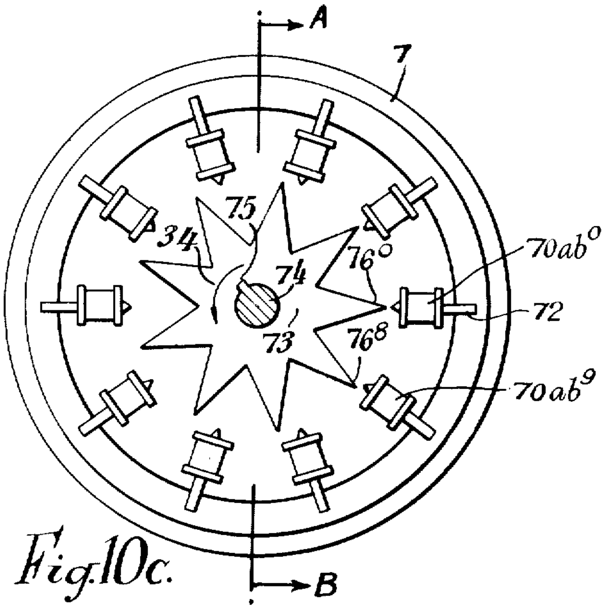
Figure 10E:
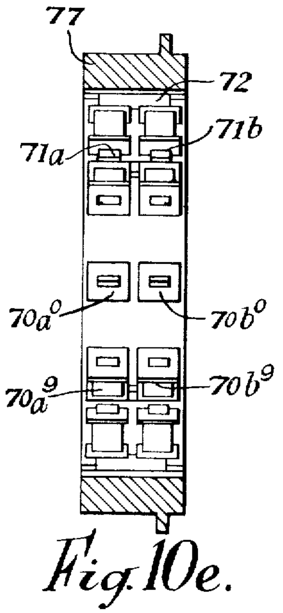
Figure 10F:
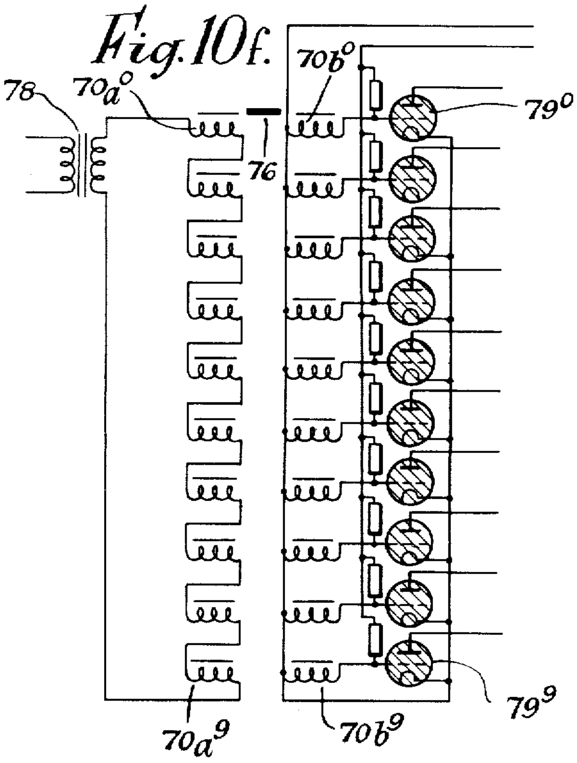
Figure 10D:
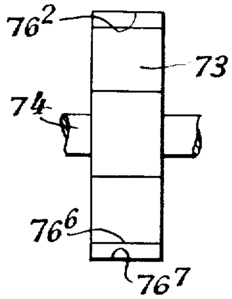

FIG. 4*a* is a perspective view of an embodiment of a magnetic signal head, for example a sensing head on a magnetizable carrier;

FIG. 4*b* is a perspective view of an embodiment of a set of heads consisting of two magnetic heads for the forwarding of a signal with change of digit value by one;

FIG. 4*c* is a perspective view of an embodiment of a set of signal heads consisting of 11 magnetic heads for transfer of computing signals in dependence on the operation of numerical value switches or the like;

FIG. 4*d* is a perspective view illustrating a set of signal heads of the embodiment of FIG. 4*c* in association with a disc of the embodiment of FIG. 3;

FIG. 4*e* is similar to FIG. 4*d* showing another embodiment of a set of heads consisting of 11 magnetic heads, which in this case embrace the disc at its edge;

FIG. 5*a, b* are schematic diagrams showing displaced signal heads under the control of a selective program input means;

FIG. 6*a* is a schematic diagram of a series of displaced signal heads, electronically controlled from a selective program input means;

FIG. 6*b* is an embodiment of a magnetically operated sector or switch;

FIG. 7 is a schematic diagram showing the use of magnetic gates for a selective control of signal heads, indicating e.g. denomination-values and digit values represented in selective tables;

FIG. 8 is a schematic circuit diagram showing the use of a magnetic drum with selective distributing means controlled electrically by signals in a synchronizing track and the possibility of transfer or retransfer in a similar arrangement to magnetic tapes;

FIG. 9 is a schematic circuit diagram similar to FIG. 8 with a number of signal heads operating in parallel and wherein the signals may be transferred to or from the tape in a selective manner with or without rearrangement, and with the simultaneous transfer of synchronizing and information signals;

FIG. 10*a* is a schematic circuit diagram of an embodiment of an arrangement for the switching control of a set of relay tubes by a stepwisely movable tape or other record means having one synchronization and one information track;

FIG. 10*b* is a diagram of an embodiment of stepwisely operable cyclic storage means with magnetizable layer for selective or repeated sensing of signals transferred from the tape of FIG. 10*a* to the said magnetizable record means;

FIG. 10*c* is a view in the axial direction of a magnetically operating distributor;

FIG. 10*d* is a view of the rotor of the distributor of FIG. 10*c*;

FIG. 10*e* is a section on the line A–B of the distributor of FIG. 10*c*.

Figure 11C:
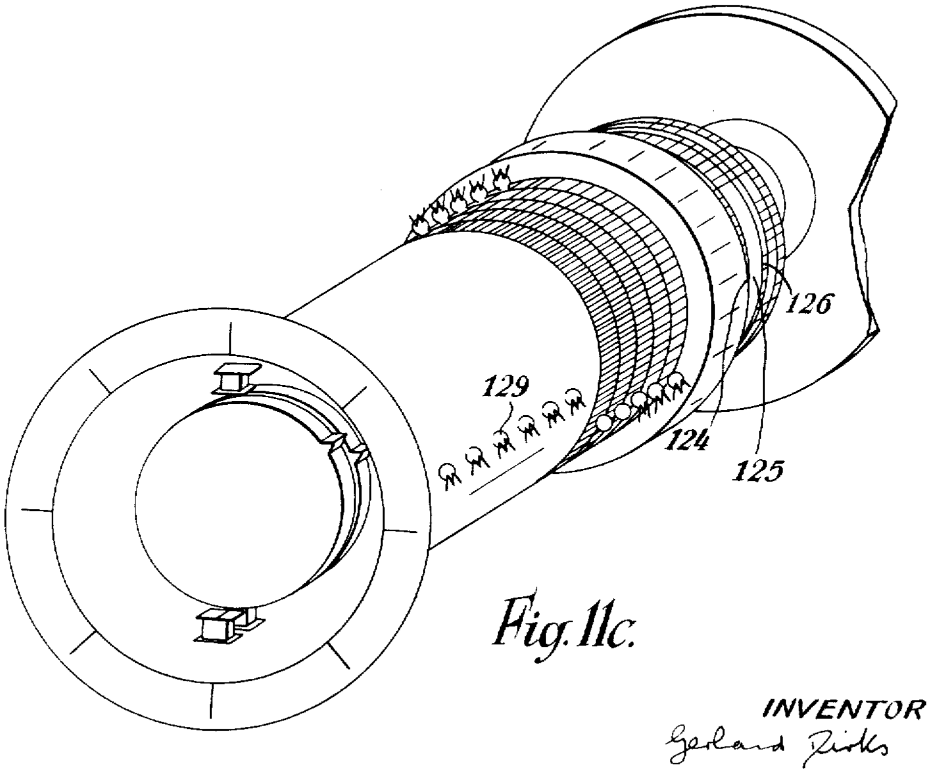
Figure 11A:
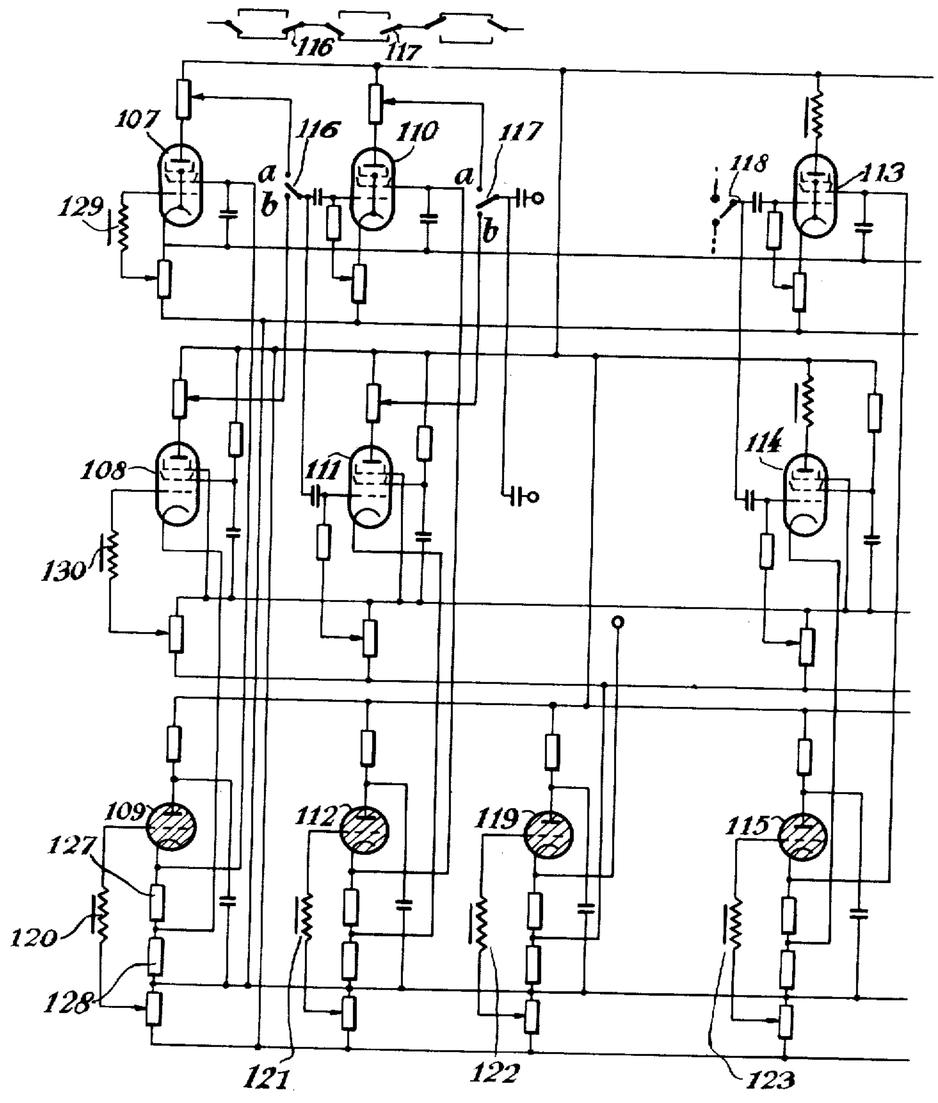

FIG. 10*f* is a circuit diagram of an embodiment of an arrangement for the control of gas discharge tubes by the distributor of FIG. 10*c*;

FIG. 11*a* is a schematic circuit diagram of an embodiment of an arrangement for selective comparing means for addresses for binary numbers of several denominations;

FIG. 11*b* is a development of a cylindrical part of the embodiment of FIG. 11*a* with means for a binary address in several denominations;

FIG. 11*c* is a perspective view of an embodiment of a magnetic drum storage with selective sensing and recording means under the control of signals forming a multi-denomination address.

Figure 1:
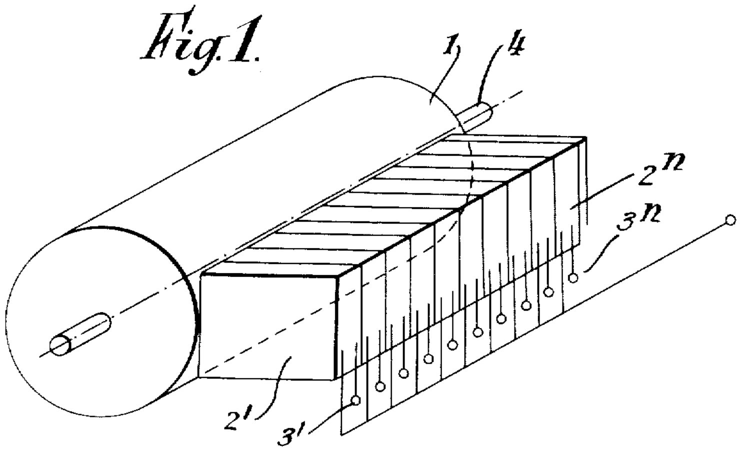
FIG. 1 is a perspective view of a rotatable magnetic storage drum with one arrangement of sensing means.

In FIG. 1, the rotation-symmetrical signal carrier is shown as rotatable drum 1, the circumferential surface of which is or is provided with a magnetizable layer adapted for the storage of signals by a change of the magnetizable state of the material of such layer. There is shown also a plurality of signal head casings $\mathbf{2}^{1-n}$ arranged side-by-side and each containing one or more signal heads or systems of signal heads.

Figure 2:
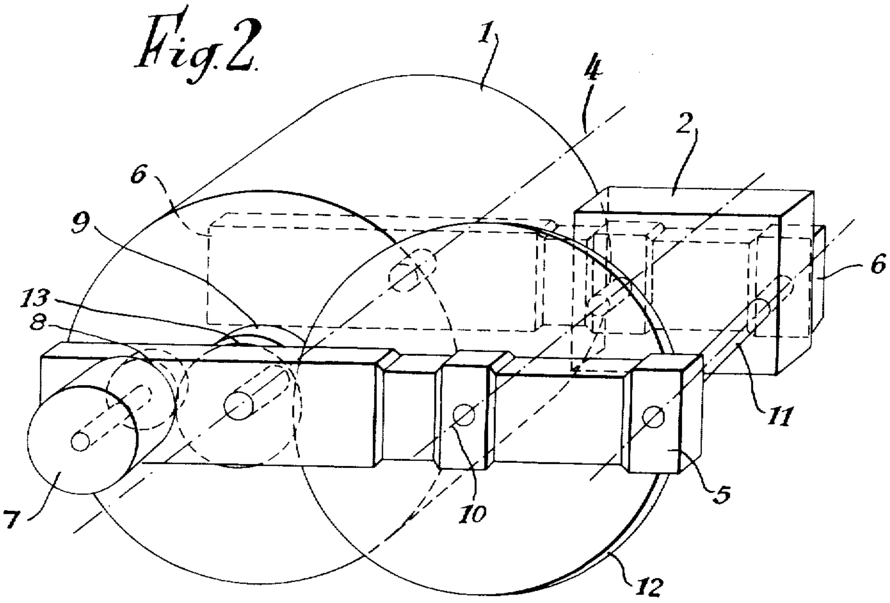
FIG. 2 is a schematic perspective view of a magnetic storage drum with movable magnetic heads.

In FIG. 2, the rotation-symmetrical signal carrier is likewise a rotatable drum 1, and a single signal head casing 2 is shown which may move axially of the drum.

In both cases, by reason of the relative rotation between the drum and the signal heads, these heads trace out on the drum side-by-side signal tracks and in each rotation, all the signals in a track will pass the signal heads which then lie opposite the track.

In order that the selective storage means shall have a rapid access, that is, in order for any part of the storage surface to be brought to a signal head in the least possible time for the sensing and/or recording or erasing of signals, it is necessary to select an appropriate part of a particular track. This involves a selection in a direction axially of the drum and a selection circumferentially of the drum, either of which selections may be carried out in different ways. If, for instance, a plurality of signal heads or signal head systems is disposed around the drum, the degree of angular displacement of the drum necessary to select a particular signal is reduced, and the access time is correspondingly shortened.

For the selection of a track from the several side-by-side tracks, the switching circuits of a plurality of side-by-side signal heads arranged axially of the drum may be made effective selectively. This arrangement is illustrated diagrammatically in FIG. 1, where the signal head casings are indicated at $\mathbf{2}^{1-n}$ and the connections to the switching circuits are indicated at $\mathbf{3}^{1-n}$. Alternatively, one or more signal heads may be moved axially of the drum to effect track selection. This arrangement is illustrated diagrammatically in FIG. 2.

Referring to FIG. 1 in more detail, the drum 1 is mounted for rotation about the axis 4 by means not shown, and may have a speed of, for example, up to 6,000 r.p.m. With a drum of a diameter of for example, 7 to 10 inches, each circumferential signal track may contain between 1,000 and 5,000 signals, and with a drum of a length from 6 to 12 inches there may be for example 100 signal tracks.

In order to avoid wear on the drum surface and on the signal heads at such speeds, and in order to make possible the recording and/or sensing of the required number of signals in a track, the signal heads are spaced from the drum surface, the extent of such spacing being dependent on the one hand on eliminating friction and on the other hand allowing the required subdivision of the circumferential track into the required number of areas for recording the required number of signals.

In the arrangement illustrated in FIG. 2, the drum 1 is carried on a shaft 4 which is mounted in brackets 5 and 6, and is adapted to be driven by a motor 7 through gear and clutch means indicated at 8 and 9, whereby the rotation of the drum may be continuous or intermittent, as desired. In the brackets 5 and 6 there are also mounted another shaft 10 and a guide rod 11, and these (shaft 10 and rod 11) carry the casing 2 containing the signal head or heads.

At the one end of shaft 10 is a gear 12 which is adapted to be rotated by gear and clutch means 13 for continuous or intermittent operation, and the gear 12 is connected with means such as cam, or screw and nut mechanism whereby its rotation effects a corresponding lateral movement of the casing 2, this movement being continuous or intermittent selectively as determined by an operation of the clutch. Clutch and gear 9 and 13 are both driven by the motor 7.

By a selective operation of the drives to the drum and the member 8, a direct access to any part of the drum surface by the signal heads may be realized in a short time, to select any of the tracks. If side-by-side signal heads are shifted laterally, a group of tracks may be selected by the selective switching on of signal heads and a further selection may be achieved by a lateral shifting. When the tracks are arranged longitudinally to the drum, the signal heads may have cyclic shifting movement and the drum may have an intermittent rotation, whereby any of such track, may be selected for sensing by one or a group of signal heads.

In some cases the drum may have a cyclic rotation and the casing 2 an intermittent movement, while in other cases the situation may be reversed.

In the embodiment of FIG. 3, where the signal carrier is a disc 13, the side-by-side tracks are concentric rings and the signal heads have a radial displacement or movement instead of an axial displacement or movement. The same selective combinations of continuous and intermittent movements may be carried out as described in connection with the drum in FIGS. 1 and 2.

The disc 13 is mounted on the shaft 14 for rotation therewith and its magnetizable surface may be regarded as (imaginatively) divided into the said concentric tracks $\mathbf{15}^{a-n}$ and also into sectors between radial lines, for instance the sectors $\mathbf{16}^{1-13}$. Within each sector the tracks $\mathbf{15}^{a-n}$ are regarded as divided into subsections e.g. $\mathbf{17}^{0-3}$, and also as divided into 40 storage locations $\mathbf{18}^{0-39}$. Each of such storage locations is a locality for the recording, sensing and/or erasing of signals, for example digit value signals. Such signals have a definite local relationship to precise points on the shaft or disc, for instance, a precise relationship with the angular position of the keyway 19, or they may have a precise relationship with signals recorded as synchronizing signals in one or more tracks, for instance the tracks 20, 21, such synchronizing signals being either again in definite local relationship to precise points on the shaft or disc, or themselves forming the time base for a time-base signal generator, operating in synchronism with the relative movement between them and sensing means provided for the sensing of such signals.

Such synchronizing signals are provided within track 21 once only within each sector namely at the beginning of the sector (in the arrow-direction of rotation 23) and are indicated as strokes $\mathbf{22}^1$, $\mathbf{22}^2$, $\mathbf{22}^3$, $\mathbf{22}^{12}$, etc. In track 20, synchronizing signals $\mathbf{23}^{0-9}$ are provided for the controlled selective sensing, recording and/or erasing of signals or groups of signals within the respective fields $\mathbf{18}^{0-9}$ in the different tracks $\mathbf{15}^{a-n}$ of each of the sectors $\mathbf{16}^{1-13}$.

Such synchronizing signals may also be supplied to a comparison device comparing them with other synchronizing signals delivered from another signal generator and the result of the comparison may be made to control the speed of the driving means for the record means.

The recording, sensing and erasing of the magnetic signals on and from the disc can be carried out in any manner known from magnetic tape sound technology and the like. Examples of signal heads and their manner of use are illustrated in FIGS. 4*a*–4*e*.

Each of the concentric tracks such as $\mathbf{15}^{1-n}$ on the disc 13 may be used for the storage of one multi-denominational decimal number. One digit of such a number is stored in each of the sectors 16. Each digit is represented by a signal recorded in one of the storage locations of a sector. For example, a signal 300 is recorded in track

15$a$ in the storage location 18$^8$ of sector 16$^1$. This signal represents the decimal eight because it is recorded in storage location 18$^8$, that is, the value which a recorded signal represents corresponds to the suffix number of the storage location in which it is recorded. Similarly, signal 301 in storage location 18$^2$ of sector 16$^2$ represents the decimal digit two. The least significant digit of a number is recorded in sector 16$^1$, the next digit in sector 16$^2$, and so on, the most significant digit of a twelve digit number being recorded in sector 16$^{12}$. Sector 16$^{13}$ is not used for digit recording and the passage of this sector past the various magnetic heads which may be associated with the disc provides a time in which the section of particular heads, and similar switching operations, may be performed.

Referring again to FIG. 1, there is shown a plurality of signal heads which may be made effective selectively and which trace circumferential tracks on a drum. In FIGS. 5$a$ and 5$b$ the track 24 at the right hand side represents a part of one of such tracks.

FIGS. 5$a$ and 5$b$ show that a plurality of signal heads 32$^{0-9}$ is provided displaced relatively to each other lengthwise of the track, namely in positions circumferentially of the drum. The separation between adjacent heads is equal to the separation between adjacent storage locations. These signal heads are selectively switchable in dependence on a control mechanism including a rotatable sector switch having contacts 39$^1$–39$^n$ and a rotating contact arm 42 mounted on a pivot 40. The sector switch operates in synchronism with the rotation of the drum whereby at any given time instant in a cycle of rotation any one of the signal heads 32$^{0-n}$ may be made effective selectively under the control of a selective input device.

In FIGS. 5$a$ and 5$b$ the sector switch is shown as having its contacts 39$^{1-n}$ connected to the vertical rows of electrical contacts a full keyboard in which the horizontal rows 36$^{0-9}$ of electrical contacts are connected to one end of the respective signal head windings, the other ends of the windings being connected in parallel to an amplifier circuit 41, to which also the contact arm 42 is connected. The amplifier circuit 41 amplifies signals sensed by sensing head 31 from a signal track 24$a$ which is on the same signal carrier as the track 24. The arrangement illustrated in FIGS. 5$a$ and 5$b$ is described in detail in my copending patent application Serial No. 432,093, filed May 25, 1954.

Briefly, when a recorded signal, such as 303, passes the gap of the head 31$^0$ a voltage impulse is induced in the head winding. This voltage impulse is passed by switch 43 to the input of the amplifier 41. This produces a corresponding output from the amplifier which passes via the switch arm 42, contact 39$^1$ (FIG. 5$a$), and a closed contact of the keyboard, represented by the marked junction, to the winding of head 32$^8$. Hence the head 32$^8$ is energized to record a signal in a storage location of the track 24. The track 24 is divided into sectors in a manner similar to that of the tracks 15 on the disc 13. The track 24$a$ has a signal such as 303 recorded at the beginning of each sector. The positioning of the heads 32 is such that the signal recorded by the head 32$^8$ will be in the eighth storage location. It will be apparent that with the switch arm 42 in the position shown in FIG. 5$b$, a signal will be recorded by the head 32$^2$ in the second storage location. The movement of the switch arm is synchronized with the movement of the storage drum, so that a different sector of the drum is beneath the heads 32 each time the switch arm 42 makes contact with a different one of the contacts 39.

Instead of an electromechanical sector switch, a magnetically operated distributing means may be used as shown for example at 53$^{1-8}$ and 54$^{1-8}$ in FIG. 6$a$. Further, instead of a full keyboard, electric or electronic relays in varying forms may replace the keyboard control contacts as described in more detail in my copending patent application Serial No. 432,093 filed May 25th, 1954, and described in some forms below.

Such electronic relays are illustrated in FIG. 6$a$ as gas discharge tubes 43$^{0-9}$, each controlling the respective pentodes 44$^{0-9}$, the anodes of which are connected to the several signal heads 32$^{0-9}$.

The signals from the head 31$^0$ are applied to the other controlling grids of the pentodes 44 in common. Hence, an individual pentode produces an output signal only when the associated gas tube is conducting and the head 31$^0$ generates a signal.

In FIG. 6$b$ there is shown the construction of the magnetically operated sector switch comprising rotatable members 47, 48 mounted on the shaft 4 which carries the storage drum and having projections 49, 50 respectively. One pair 53$^6$ and 54$^6$ of the primary and secondary coils 53, 54, which cooperate with the projection 49 is shown. Another pair of primary and secondary coils 55, 56 is shown cooperating with the projection 50. There are also shown coils 53$^1$ and 54$^1$ cooperating with the projection 49. It will be appreciated that the other coils 53 and 54 are similarly mounted in circular fashion about the rotatable member 47. The coils 53 are connected in series across a power source (FIG. 6$a$) so that a current flows continuously. When the projection 49 passes near the core on which a pair of coils 53 and 54 is wound a large change of magnetic flux occurs and a voltage impulse is induced in the secondary coil 54.

FIG. 7 shows an arrangement of two entry magnetic gates 140$^{0-9}$ to 149$^{0-9}$ controlling signal transfer between two tracks of the storage drum. One entry (vertically in the drawing) effects the selection of one column of magnetic cores under the control of the tubes 135$^{0-9}$ and the other entry (horizontally in the drawing) effects selection of one row of magnetic cores under the control of the tubes 136$^{0-9}$, by means of the windings on the magnetic cores. Only that gate is sufficiently energized to be effective which receives a double-energization In the case shown this allows a selection of any of one of 100 cores. by only two ten-fold entry means. The manner in which this arrangement may be used to effect the addition of two decimal digits is described in detail in my copending application Serial No. 432,093.

Selected timed signals are fed by the core arrangement to electronic tubes 137$^{0-9}$ or 138$^{0-9}$ selectively, to record on a drum track by operating the recording signal heads 150 and 151 at selected times according to the control exercised by the gates. FIG. 7 shows one entry being effected by signal heads 31$^1$ and 31$^2$ which sense the track 24$a$ and deliver signals to amplifier 41 to influence via the magnetic distributing means 139$a/b^{0-9}$ the control grids of said electronic tubes 135$^{0-9}$. The magnetic distributor 139 is similar in construction to the arrangement shown in FIG. 6$b$. The other entry is controlled by the keyboard, the grids of the valves 136$^{0-9}$ being connected to the cathodes of the valves 43$^{0-9}$ of FIGURE 6$a$.

FIG. 8 shows one arrangement of a cooperation between a storage drum and an output means. The drum has an area 88 for information signals and a track 88$a$ for synchronizing signals which latter signals control the electronic distributor 90. The electronic distributor 90 influences the grids of the gas discharge tubes 91$^1$–91$^n$ successively in coordination with the sensing of the synchronizing signals, whereby information signals are delivered to the output means only at time instants determined by their relationship with the synchorizing signals. The synchronizing signals may instead of being signals sensed on a magnetizable layer, be signals from some other signal generator coordinated to the rotation of the drum, such as, for example, signals from inductive elements such as shown in FIG. 6$b$ operating as a pulse generator.

By means of the synchronized transmission of signals controlling the tubes 91$^1$–91$^n$, and by the use of interchangeable connecting means between such tubes and magnets or other electrically controllable means, any desired mechanical or other effect may be obtained at any desired place at any time in dependence on the stored information signals on the drum. In the case shown, magnet coils are energized selectively in dependence on such stored information signals, such coils being part of a parallel-operating printing mechanism.

The circuit shown in FIG. 8 is described more fully in my copending Patent Application Serial No. 498,041 filed March 30, 1955, now Patent No. 2,972,016.

Referring now to FIG. 9 selective signal transfer from a record means in the form of a drum to a magnetic tape, or the reverse, is shown. Both record means shown have corresponding synchronizing tracks 92, 93 in which signals transferred from the one and the other have the same timed relationship to information signals also transferred selectively from the one record means to the other. This relationship between synchronizing signals and information signals is preferably obtained when both signals are transferred at the same time.

FIG. 9 shows a recording device in which the signals are stored on a magnetizable drum 100. The recording heads $\mathbf{94}^{0-e}$ connected with the key operated switches $\mathbf{95}^{0-e}$ of the keyboard, correspond to the recording heads 32 of FIG. 5 in their function. The coils **70*a* and 70*b* and discharge tube 79 in connection with the magnetic yoke 76** are shown in more detail to FIGS. 10*a*, *b*, *c* and *d*. The transfer of signals and of control frequencies from the drum 100 to the tape 101 is effected selectively under any desired control, for instance in dependence on a selected operation of switches $\mathbf{95}^{0-e}$ for a selection of tracks and operation of the inductive distributor **70*a*, 70*b* and 76**, for selection of localities within the selected tracks.

The signals are sensed by sensing heads $\mathbf{102}^{0-9,a-e}$ and transferred via signal heads 36 and pentodes 103 of which only one is shown to the tape 101, whereas the control frequency is sensed by signal head 104 and transferred via pentode 105 and signal head 106 to the synchronization track of the said tape.

The inductive distributor according to FIGS. 10*a–d* comprises in stator 77 a circle of ten primary coils $\mathbf{70}a^{0-9}$ and ten secondary coils $\mathbf{70}b^{0-9}$, the cores **71*a* and 71*b* of which are on their one side connected with each other in pairs by the yokes 72**. FIG. 10*c* shows the sideview and FIG. 10*e* the section on A–B of FIG. 10*c* of the stator. The rotor 73 is fixed on shaft 74 by a key 75 in a defined position relative to the magnetizeable drum. It is of starlike form with teeth $\mathbf{76}^{0-8}$ and in the example has nine teeth equally spaced so that between the 9 parts of the rotor and between the ten parts of the stator there is vermierlike displacement by rotor movement in the direction of the arrow 34, which is used for the purpose of the digit value distribution for the digit value signals 0–9 in the different sectors of the record means.

The rotor 73 is fixed by its key 75 on shaft 74 in such a way that in that timing instant, in which, e.g. according to FIG. 5*a*, the digit value field 0 is below the gap of the sensing head $\mathbf{31}^0$ in track **24*a*, the teeth $\mathbf{76}^0$ of the starlike rotor 73 is exactly opposite the cores $\mathbf{71}a^0$ and $\mathbf{71}b^0$ of the pair of coils $\mathbf{70}a^0$ and $\mathbf{70}b^0$ connected magnetically by the stationary yoke 72. The reluctance of the magnetic circuit is very reduced at that instant, so that the primary coil $\mathbf{70}a^0$ is effectively magnetically coupled to the secondary coil $\mathbf{70}b^0$ as in a transformer. A digit value signal 0 recorded on track 24*a*** will be sensed at that instant. For all other pairs of coils there is poor magnetic coupling because they have a high reluctance magnetic circuit. A sensed signal 0 therefore, supplied to all the primary coils $\mathbf{70}a^{0-9}$ will generate an appreciable signal only in the effectively coupled secondary coil $\mathbf{70}b^0$.

If in the next instant the storage location corresponding to 1 is below the sensing head $\mathbf{31}^0$, the magnetic coupling of the coils $\mathbf{70}a^1$ and $\mathbf{70}b^1$ is effected by the tooth $\mathbf{76}^1$. In the timing instant 2 the coils $\mathbf{70}a^2$ and $\mathbf{70}b^2$ are magnetically coupled via the tooth $\mathbf{76}^2$ etc., until after 9 the inductive distributor begins with 0.

For a better understanding, in FIG. 10*c* there is shown a vernier division, in which in one rotation of the rotor each coil will be effective ten times, giving a total of 100 storage locations in ten sectors. It is evident that when 13 sectors are used, each subdivided into 40 digit value storage locations, suitable modifications will be made to the rotor and stator. By reason of using the vernier divisions larger coil spacing can be allowed.

As FIG. 10*f* shows, the primary coils $\mathbf{70}a^{0-9}$ are connected in series and via transformer 78 to a discharge circuit (not shown) controlled by sensing head $\mathbf{31}^0$ (compare FIG. 5*a*). At that instant in which a digit value signal is snsed by the sensing head $\mathbf{31}^0$ in track **34*a* an impulse is generated by the amplifier circuit—which is fed to the primary coils $\mathbf{70}a^{0-9}$. A movable magnetic tooth 76** serves to effectively one of the secondary coils $\mathbf{70}b^{0-9}$ which the corresponding primary coil so that within the secondary coil a voltage surge is induced, which corresponds to the respective digit value signal 0–0. Such a voltage surge is used for the ignition of one or another of the relay-tubes connected to each secondary coil, for instance gas discharge tubes $\mathbf{79}^{0-9}$, by means of which output or storage means can be operated in accordance with the timing of digit value signals.

FIG. 10*a* shows by means of a schematic diagram the control of electronic relay tubes in dependence on information signals contained in one track 175 of a record means, for example a magnetizable tape. Synchronizing signals are contained in another track of the tape within the synchronizing track 174.

In the arrangement of FIG. 10*a* is shown a magnetizable tape having one information track 175 sensed or recorded by signal head 177 and a magnetizable synchronizing track 174 in which the signals are sensed or recorded by means of signal head 176. The arrangement is shown operative for sensing. The synchronizing track 174 contains magnetized areas the begining of which may be indicated by a start signal 178 and the ending of such an area by a stop signal (not shown), which would be situated in the right hand portion of the tape shown in FIG. 10*a*.

The arrangement of FIG. 10*a* is to show an example of the recording of signals on a tape as being comparable in effect to a punched card. Each area of the tape beginning at start signal 178 on the left side and ending at the not shown stop signal on the right side is to contain all the signals of a punched card e.g. an eighty column punched card. The values are so recorded that the sensing of all the columns of the digit value 9 takes place first and is followed by the sensing of all the columns of digit value 8, then follows digit value 7 and so on, comparable to the passage of the index point rows of a punched card below sensing brushes. To demonstrate the relation between information signals and synchronizing signals there is shown in FIG. 10*a* within the area $\mathbf{179}^{1-n}$ a group of synchronizing signals one for each column and wherein the whole group of columns $\mathbf{179}^{1-n}$ corresponds to the line 9 of a punched card. Instead of holes, which would be used on punched cards, information signals 180 in the information track of the tape are coordinated to those of the synchronizing signals $\mathbf{179}^{1-n}$ which correspond to the column in which a hole would be punched in a punched card. In FIG. 10*a* such information signals 180 are contained in track 175 in alignment with signals $\mathbf{179}^2$, $\mathbf{179}^9$, $\mathbf{179}^{11}$, etc. of track 174 indication that a 9 is recorded within the columns 2, 9, 11 and so on.

After a space 173, in which no information signals will be recorded and which corresponds to the moving on of a punched card from one horizontal row to the following horizontal row, the synchronizing signal area $\mathbf{207}^{1-n}$ is provided to indicate the columnar significance of information signals within track 175 representing the digit value 8. In this case, signals for the digit value 8 are shown in columns 4, 6 and so on. It is a special feature of the present invention that by the use of synchronizing signals coordinated to indicate the timed or local position of information signals for columns on digit values, a stepwise transport of such tape may be effected without losing the advantage of using synchronizing signals. Another advantage is the easy duplicating possibility for control, duplicating, sorting, selecting tasks and so on, since only two tracks have to be sensed and transferred.

The operation of the sensing arrangement is shown in FIG. 10*a* with electronic distributing means being controlled by the signals in the synchronizing track 174. The sensing head for synchronizing signals is connected to the control grid of pentode 190 which will deliver current pulses when operated by signals sensed from the synchronizing track. The capacitor 191 is therefore charged in steps by the pulses. The voltage across the capacitor is applied to a deflecting plate 185 of the cathode ray tube to deflect the electron beam from electrodes $\mathbf{187^1}$ to $\mathbf{187^n}$ on screen 186 step by step. There may be 80 electrodes 187, or there may be 10 electrodes used repeatedly eight times for 80 columns. The discharge tube 192 is to discharge the capacitor 191 after each cycle of deflection.

In this case gas discharge tubes $\mathbf{189^1}$ to $\mathbf{189^n}$, e.g. 80 gas discharge tubes are to be controlled by the information signals within track 175. At the passing of the information signals below sensing head 177 such signals are amplified in pentode 182 to deliver signals to the control grid 184 of the cathode ray tube 183. If information signal 180 corresponding to column 2 of the synchronizing area $\mathbf{179^{1-n}}$ is sensed by signal head 177 the cathode ray deflected by the deflection system 185 has reached the electrode $\mathbf{187^2}$, so that the amplified information signal delivered to control grid 184 allows beam current to flow to electrode $\mathbf{187^2}$. This produces a voltage across the load which effects via coupling capacitor $\mathbf{188^2}$ the ignition of discharge tube $\mathbf{189^2}$, whereas the preceding relay tube $\mathbf{189^1}$ remains ineffective as within this column no information signal 180 has been sensed. After the running through of the tape through the information area synchronized by the synchronizing signals $\mathbf{179^{1-n}}$ all those electronic relay tubes $\mathbf{189^{1-n}}$ are ignited which correspond to the said columns 2, 9, 11 and so on in which information signals are contained to indicate 9, as this area of the tape synchronized by the signals $\mathbf{179^{1-n}}$ is to contain all the signals for the digit value 9.

During the sensing of the gap 173 the electronic tubes $\mathbf{189^{1-n}}$ are deionized so that within the sub-area of the tape synchronized by the signals $\mathbf{207^{1-n}}$ those of the relay tubes $\mathbf{189^{1-n}}$ may be ionized anew which correspond to information signals representing digit values 8 and so on.

FIG. 10*b* shows a magnetizable rotatable record means to which the sensed signals from the synchronizing track 174 and the information track 175 may be transferred for a repeated or cyclic use.

Such cyclically operable storage means may be a magnetizable drum 204 fixed on shaft 198. The drum 204 may be driven by motor 193 via a start-stop friction clutch 194 but is normally arrested by engagement of projection 197 by armature 196 of the relay 195. If the relay 195 is energized in dependence on for example starting signal 178 (FIG. 10*a*) via an amplifier and with the distributing means known from start-stop teletyping, the friction clutch 194 will rotate the magnetizable drum or disc 204 for one rotation.

This friction clutch corresponds to the clutch 9 of FIG. 2. The shaft 198 is used to drive the tape feeding mechanism. This shaft carries a commutator 119, which is driven through a reduction gear from the shaft carrying the drum 204 in the manner described in detail in my copending application, Serial No. 432,295, now abandoned, which also describes the manner in which the gas tubes 189 control the energization of the beads 208 by means of a magnetically operating distributing switch.

The signals of each tape area are recorded in two parallel tracks, namely one synchronizing track and one information track via the signal head $\mathbf{203^s}$ and $\mathbf{203^{0-9}}$.

In FIGS. 11*a*–11*c* is shown an arrangement for selecting a desired part of a track by comparing a preset address registration with addresses recorded on the drum.

The sensing head 120 of the tube 109 is arranged over the address signal track 124 and sensing head 121 of tube 112 over the address signal track 125, sensing head 122 of tube 119 over the address signal track 126, and so on (FIG. 11*b*).

If tube 109 is not operative the pentode 107 is held non-conducting by a low screen voltage, whereas pentode 108 is conductive, the voltage of the screen grid of pentode 107 being provided by the voltage drop across cathode resistances 127, 128 of the tube 109, whereas the suppressor grid of pentode 108 has the same potential as the cathode of this tube as long as the tube 109 is not operative. As soon as the tube 109 becomes operative the pentodes 107 and 108 change with respect to their operation, i.e. pentode 107 is conductive while pentode 108 is non-conducting, pentode 107 having received its screen grid voltage, whereas the cathode of pentode 108 has become positive with regard to its suppressor grid potential.

Switch 116 has either position *a* or position *b* depending on whether the first element of the address combination requires a signal (position *a*) or no signal (position *b*) position. The switch 116 may be the contact of an electromagnetic relay or may be a manually operated switch.

Signals sensed from an information storage area by sensing head 129 will pass to the switch 116 only if tube 109 is operative, i.e. if pentode 107 is conductive. In position *b* of the switch 116 no signal transmission from sensing head 129 is possible in spite of pentode 107 being the necessary continuity of the circuit for such sensed information signals being interrupted by means of said switch 116.

The various possibilities for continuity and discontinuity in the signal transmission circuit will be understood from the diagram at the top of FIG. 11*a*, where in each unit of the chain of gates there are two switch elements one of which is comprised by the electronic tubes such as the tubes 107, 108, 109 in the first gate shown, and the other of which switch elements comprises switches 116 etc.

Beginning from the left of FIG. 11*a*, information signals entering either chain at the sensing heads 129, 130, pass the first gate of the chain if the electronic switch 107, 108 coincides with the selecting switch 116 which has been preset (being for example in the upper position 116*a*). Such coincidence takes place only during that time period of the rotation of the storage when both the switches are in the upper or both in the lower position, in the case shown, if the electronic switch is in position 107, that is when pentode 107 is conducting in dependence on the tube 109 being operative. The signals sensed by signal head winding 129 arrive at the grids of the pentodes 110, 111 which pentodes are connected in parallel via capacitors.

The sensing heads 129, 130 are separate windings of a single head.

Information signals sensed by the sensing heads 129, 130, after having passed through the chain of combination switches may be transferred to another storage device, which may be a magnetizable storage, or a relay tube storage, or a cathode ray storage, the deflection of the cathode ray being in sychronism with the original storage in dependence or synchronizing signals sensed from that storage or from another signal generator, which controls the relative movement between the storage and the sensing means.

When a transfer to another magnetic storage is to be effected, synchronizing signals for the information signals will be taken either from the same track in the information storage, e.g. start-stop signals or distributing pulses for one or more digit values and/or demonination values, or from a separate synchronizing track the signals in which have a defined position relatively to signals in the information track.

The same switchable selection conditions obtained in each successive gate in the chain. For example, in the second gate illustrated the pentode 111 being conductive since tube 112 is not operative and coinciding with the relay switch 117 in the lower position shown, the signals are passed to the third gate of the chain, and so on.

With a 5-stage binary selection device there are in each cycle of operation 32 ($2^5$) possibilities of selecting different areas within each track of the storage each area containing multicolumn information in for example 50–100 column positions. If one fourth binary stage is added to the selection device the number of selection possibilities would be 64 ($2^6$).

For an easier understanding of the method of selection, the tube 109 is shown as a gas discharge tube with a capacitative anode load operating so that the pentode 107 is rendered operative only for the minimum period between successive signals. The information signals induced in signal heads 129, 130 are always effective at a position corresponding to the middle of such an interval.

Within the second group of pentodes 110, 111 controlled by tube 112 the same process takes place, that is, the signal transmited by signal heads 129 and 130 are only further transmitted if tube 112 is nonoperative, that is when pentode 111 is open and the switch 117 is in position *b*.

According to FIG. 11*b*, the control of the alternate opening and blocking of pentodes 107, 108 is shown by way of example as a signal sequence illustrated diagrammatically at 124. Pentode 107 is understood to be conducting during the period represented by the upper half of the track 124 in each rotation and nonconducting during the period represented by the lower half, i.e. pentode 107 is conductive during the first 180° of one rotation, whereas during the next 180° of a rotation pentode 108 is conductive. Similarly, pentode 110 is conductive and pentode 111 is nonconductive from 0 to 90° and from 180 to 270° in each cycle of track 125, whereas it is nonconducting and pentode 111 is conducting from 90° to 180° and from 270° to 360° in each cycle.

This automatic opening and closing of the electronic switches during each cycle brings about the combination of automatically opened and blocked switches with the preset positions *a* and *b* of the switches 116, 117, 118 or corresponding electronic or other relays, switching panels, keyboard contacts or the like.

To avoid too strong unamplification of the signals produced in the sensing heads 129 and 130, transmission to the control grid of the next tube is provided by means of a tapping point of the respective anode resistor. In the drawing, only the first two and the last of the chain of switches is shown.

There may of course be any number of selection groups in the chain. Thus, only those signals from the sensing heads 129 and 130 are transmitted through the whole chain of selection group switches, when the electronic switches, in combination with the position of the preset switches establish a continuous circuit.

In the moment at which the combination of the switches 116, 117, 118 and so on corresponds to the sensed combination of signals the information signals pass from the sensing head 129 or 130 through the chain to control further means, such as converters for dot and line-printers and the like as set forth in my copending patent application Serial No. 498,055 filed March 30, 1955, now Patent No. 2,982,951.

The address pattern of FIG. 12*c* may equally well be produced by magnetic projections from the drum surface, or by a pattern of black and white areas suitable for sensing by photoelectric cells instead of magnetic heads.

I claim:

1. A storage arrangement comprising, in combination, a rotatable magnetic record medium having a plurality of tracks, said tracks having recorded therein different data items in sequential order, said data items representing selected characters, digits of words and digits of numbers; storage means for storing different data items; stored address means for providing a stored address for selecting informations recorded on said record medium; serial readout means operative in a track of said record medium for reading-out a plurality of said data items in said track, said serial readout means comprising sensing means adapted to sequentially sense said data items in said track, electronic distributing means for transferring data items sequentially sensed by said sensing means to determined positions of said storage means, and selectively controlled gating means for controlling the selective transfer of data items from said sensing means to said distributing means; and track selecting means for selecting sensing means for operation in sensing a selected track by moving selected sensing means to said selected track.

2. A storage arrangement comprising, in combination, a rotatable magnetic record medium having a plurality of tracks, said tracks having recorded therein different data items in sequential order, said data items representing selected characters, digits of words and digits of numbers; storage means for storing different data items; stored address means for providing a stored address for selecting informations recorded on said record medium; serial readout means operative in a track of said record medium for reading-out a plurality of said data items within a selected area of said track, said serial readout means comprising sensing means adapted to sequentially sense said data items in said track, electronic distributing means for transferring data items sequentially sensed by said sensing means to determined positions of said storage means, and gating means for controlling the selective transfer of data items from said sensing means to said distributing means; comparing means for opening said gating means to permit the transfer of data items from said sensing means to said distributing means upon the coincidence of elements of data items of address data provided by said stored address means and elements of data items sensed from said record medium; and track selecting means for selecting sensing means for operation in sensing a selected track by actuating selected sensing means.

3. A storage arrangement comprising, in combination, a rotatable magnetic record medium having a plurality of tracks, said tracks having recorded therein different data items in sequential order, said data items representing selected characters, digits of words and digits of numbers; storage means for storing different data items; stored address means for providing a stored address for selecting informations recorded on said record medium; serial readout means operative in a track of said record medium for reading-out a plurality of said data items within a selected area of said track, said serial readout means comprising sensing means adapted to sequentially sense said data items in said track, electronic distributing means for transferring data items sequentially sensed by said sensing means to determined positions of said storage means, and gating means for controlling the selective transfer of data items from said sensing means to said distributing means; comparing means for opening said gating means to permit the transfer of data items from said sensing means to said distributing means upon the coincidence of elements of data items of address data provided by said stored address means and elements of data items sensed from said record medium; and track selecting means for selecting sensing means for operation in sensing a selected track by moving selected sensing means to said selected track.

4. A storage arrangement comprising, in combination, a rotatable magnetic record medium having a plurality of sector portions and a plurality of parallel tracks, said tracks having recorded therein different data items in sequential order, said data items representing selected characters, digits of words and digits of numbers, digits of numbers of the same denomination being recorded in different tracks of the same sector portion of said record medium; storage means for storing different data items; stored address means for providing a stored address for selecting informations recorded on said record medium; serial readout means operative in a track of said record medium for reading-out a plurality of said data items in said track, said serial readout means comprising sensing means adapted to sequentially sense said data items in said track, electronic distributing means for transferring data items sequentially sensed by said sensing means to determined positions of said storage means, and selectively controlled gating means for controlling the selective transfer of data items from said sensing means to said distributing means; and track selecting means for selecting sensing means for operation in sensing a selected track by moving selected sensing means to said selected track.

5. A storage arrangement comprising, in combination, storage means for storing different data items representing digits of numbers, said storage means comprising a plurality of storage areas for digit values of different denominations, each of said storage areas having recorded therein different digit values of the same denomination; recording means; a magnetic record medium moved relatively to said recording means; and sequentially operating selective switching means for successively energizing said denominational areas in a manner whereby the digit items stored in said storage means are transferred to said record medium into selected positions in accordance with their denominational values.

6. A storage arrangement comprising, in combination, storage means for storing different data items representing digits of numbers, said storage means comprising a first group of substantially parallel conductors spaced from each other, a second group of substantially parallel conductors spaced from each other and positioned transversely to said first group of conductors, a plurality of coupling means for coupling each conductor of said first group of conductors to every conductor of said second group of conductors, said first group of conductors being adapted to be energized by the same digital values of different denominations and said second group of conductors being adapted to be energized by different digital values of the same denomination; a plurality of recording means, each of said recording means being connected to a corresponding conductor of said first group of conductors corresponding to a determined digital value; a magnetic record medium moved relatively to said recording means; and sequentially operating selective switching means having a plurality of switching positions each connected to a corresponding conductor of said second group of conductors corresponding to a determined denomination, said selective switching means successively assuming different switching conditions corresponding to said switching positions in a manner whereby the data items stored in said storage means are transferred through said recording means to said record medium into selected positions in accordance with their denominational values.

7. A storage arrangement comprising, in combination, storage means for storing different data items representing digits of numbers, said storage means comprising a first group of substantially parallel conductors spaced from each other, a second group of substantially parallel conductors spaced from each other and positioned transversely to said first group of conductors, a plurality of coupling means for coupling each conductor of said first group of conductors to every conductor of said second group of conductors, said first group of conductors being adapted to be energized by the same digital values of different denominations and said second group of conductors being adapted to be energized by different digital values of the same denomination; a plurality of recording means, each of said recording means being connected to a corresponding conductor of said first group of conductors corresponding to a determined digital value; a magnetic record medium moved relatively to said recording means; and sequentially operating selective switching means having a plurality of switching positions each connected to a corresponding conductor of said second group of conductors corresponding to a determined denomination, said selective switching means successively assuming different switching conditions corresponding to said switching positions in synchronism with the relative movement between said record medium and said recording means in a manner whereby the data items stored in said storage means are transferred through said recording means to said record medium into selected positions in accordance with their denominational values.

8. A storage arrangement comprising, in combination, storage means for storing different data items representing digits of numbers, said storage means comprising a first group of substantially parallel conductors spaced from each other, a second group of substantially parallel conductors spaced from each other and positioned transversely to said first group of conductors, a plurality of coupling means for coupling each conductor of said first group of conductors to every conductor of said second group of conductors, said first group of conductors being adapted to be energized by the same digital values of different denominations and said second group of conductors being adapted to be energized by different digital values of the same denomination; a plurality of recording means, each of said recording means being connected to a corresponding conductor of said first group of conductors corresponding to a determined digital value; a magnetic record medium moved relatively to said recording means; and sequentially operating selective switching means including a plurality of transfer coils, each of said transfer coils being connected to a corresponding conductor of said second group of conductors corresponding to a determined denomination, said sequentially operating selective switching means having a plurality of switching positions each corresponding to a selected one of said transfer coils, said selective switching means successively assuming different switching conditions corresponding to said switching positions in synchronism with the relative movement between said record medium and said recording means in a manner whereby the said selective switching means generates pulses in said transfer coils in succession so that the data items stored in said storage means are transferred through said recording means to said record medium into selected positions in accordance with their denominational values.

9. A signal storage arrangement comprising, in combination, a rotatable body having a magnetizable signal storage track thereon; a magnetic sensing head cooperating with said track; a signal distributor including a signal input means and a plurality of signal output means, said signal distributor including a plurality of pairs of coils, one coil of each pair being connected to said signal input means and the other coil of each pair being connected individually to one of said signal output means, said coils being relatively weakly coupled by an open magnetic circuit, said pairs of coils being equally spaced apart in arcuate array, a magnetic member rotatable in synchronism with said rotatable body, said magnetic member comprising a wheel with a number of equally spaced teeth which are capable of closing in turn the magnetic circuits of said coils as said wheel rotates, the number of teeth being one less than the number of said pairs of coils whereby the coils of each pair are momentarily coupled relatively closely; a plurality of static storage devices; each connected respectively to one of said signal output means and settable by a signal furnished by such output means; means for rotating said rotatable body and said distributor in synchronism; and means for applying electrical signals generated by said sensing head to the input means of said distributor, whereby said electrical signals are applied cyclically to said static storage devices.

10. A storage arrangement comprising, in combination, storage means for storing different data items representing digits of numbers, said storage means comprising a first group of first coils, said first group of first coils comprising a first plurality of series circuit arrangements substantially parallel to and spaced from each other, each of said first plurality of series circuit arrangements comprising a plurality of said first coils, a second group of second coils, said second group of second coils comprising a second plurality of series circuit arrangements substantially parallel to and spaced from each other and positioned transversely to said first group of first coils, each of said second plurality of series circuit arrangements comprising a plurality of said second coils, each of each first coils being positioned in magnetic proximity to a corresponding one of each of said second coils in a manner whereby a magnetic flux substantially greater in intensity than the magnetic flux of one of a first coil and a second coil is produced by a first coil and a corresponding second coil upon simultaneous energization of said last-mentioned first coil and corresponding second coil, said first groups of first coils being adapted to be energized by the same digital values of different denominations and said second group of second coils being adapted to be energized by different digital values of the same denomination; a plurality of recording means; a magnetic record medium moved relatively to said recording means; and transfer means connected between each of said recording means and each of said first plurality of series circuit arrangements of said first group of first coils, said transfer means being adapted to transfer in timed condition pulses to said recording means for recording in coordinated localities of said magnetic record medium in dependence upon the energization condition of corresponding ones of said first and second coils.

11. A magnetic transducer comprising, in combination, a plurality of transducer heads each having a core with an air gap formed therein and an operating winding wound thereon, said transducer heads being positioned in spaced relation to each other in a manner whereby the cores of said transducer heads are substantially parallel to each other and the air gaps of said transducer heads are in a predetermined relation to each other; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads.

12. A magnetic transducer comprising, in combination, a plurality of transducer heads each having an integrally formed core with an air gap formed therein and an operating winding wound thereon, said transducer heads being positioned in spaced relation to each other in a manner whereby the cores of said transducer heads are substantially parallel to each other and the air gaps of said transducer heads are in a predetermined relation to each other; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads.

13. A magnetic transducer comprising, in combination, a plurality of transducer heads each having a core with an air gap formed therein and an operating winding wound thereon, said transducer heads being positioned in spaced relation to each other in a manner whereby the cores of said transducer heads are substantially parallel to each other and the air gaps of said transducer heads are in a predetermined relation to each other; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads, said cores and said spacing means forming a substantially planar surface common to all of said cores and said spacing means and having said air gaps formed therein.

14. A magnetic transducer comprising, in combination, a plurality of transducer heads each having a core with an air gap formed therein and an operating winding wound thereon, said transducer heads being positioned in spaced relation to each other in a manner whereby the cores of said transducer heads are substantially parallel to each other and the air gaps of said transducer heads are in a predetermined relation to each other; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads, said cores and said spacing means forming a substantially planar surface common to all of said cores and said spacing means and having a longitudinally extending median line common to all of said cores and said spacing means and said air gaps formed in said surface in a line transverse to said median line.

15. A magnetic transducer comprising, in combination, a plurality of transducer heads each having a core with an air gap formed therein and an operating winding wound therein, said transducer heads being positioned in spaced relation to each other in a manner whereby the cores of said transducer heads are substantially parallel to each other and the air gaps of said transducer heads are in a predetermined relation to each other; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads, said cores and said spacing means forming a substantially planar surfce common to all of said cores and said spacing means and having a longitudinally extending median line common to all of said cores and said spacing means and said air gaps formed in said surface in said median line.

16. A magnetic recording and reproduction arrangement comprising, in combination, a magnetic recording medium having a plurality of tracks therein; a plurality of transducer heads each having a core with an air gap formed therein and an operating winding wound thereon, said transducer heads being positioned in operative proximity to said magnetic recording medium and in spaced relation to each other in a manner whereby the cores of said transducer heads are substantially parallel to each other and the air gaps of said transducer heads are in a predetermined relation to each other and to the tracks of said magnetic recording medium; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads, said cores and said spacing means forming a substantially planar surface common to all of said cores and said spacing means and having said air gaps formed therein, said surface being in predetermined relation to said magnetic recording medium.

17. A magnetic recording and reproduction arrangement comprising, in combination, a magnetic recording medium having a plurality of tracks therein; a plurality of transducer heads each having a core with an air gap formed therein and an operating winding wound thereon, said transducer heads being positioned in operative proximity to said magnetic recording medium and in spaced relation to each other in a manner whereby the cores of said transducer heads are substantially parallel to each other and the air gaps of said transducer heads are in a predetermined relation to each other and to the tracks of said magnetic recording medium; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads, said cores and said spacing means forming a substantially planar surface common to all of said cores and said spacing means and having said air gaps formed therein, said surface being substantially parallel to said magnetic recording medium with each of the air gaps formed therein in operative proximity to a corresponding one of the tracks of said magnetic recording medium.

18. A magnetic recording and reproduction arrangement comprising, in combination, a magnetic recording medium having a plurality of tracks therein; a plurality of transducer heads each having a core with an air gap formed therein and an operating winding wound thereon, said transducer heads being positioned in operative proximity to said magnetic recording medium and in spaced relation to each other in a manner whereby the cores of said transducer heads are substantially parallel to each other and the air gaps of said transducer heads are in a predetermined relation to each other and to the tracks of said magnetic recording medium; and a plurality of spacing means interposed with said transducer heads, each of said spacing means being positioned between adjacent ones of the cores of said transducer heads in such a manner that it maintains a predetermined separation between said adjacent ones of said transducer heads and it maintains said predetermined relation between the air gaps of the said transducer heads, said cores and said spacing means forming a substantially planar surface common to all of said cores and said spacing means and having said air gaps formed therein, said surface being substantially perpendicular to said magnetic recording medium with each of the air gaps formed therein in operative proximity to a single one of the tracks of said magentic recording medium at any specific time, said magnetic recording medium passing through said air gaps.

19. A magnetic recording and reproduction arrangement comprising, in combination, a magnetic recording medium having a plurality of tracks therein; a plurality of transducer heads each having a core with an air gap formed therein and an operating winding wound thereon, said transducer heads being positioned in operative proximity to said magnetic recording medium and in spaced relation to each other in a manner whereby the cores of said transducer heads are substantially parallel to each other and the air gaps of said transducer heads are in a predetermined relation to each other and to the tracks of said magnetic recording medium; and a plurality of spacing means interposed with said transducer heads, said spacing means being spaced from each other in the direction of the tracks of said magnetic recording medium, each of said spacing means being positioned between adjacent ones of the cores of said transducer heads in such a manner that it maintains a predetermined separation between said adjacent ones of said transducer heads and it maintains said predetermined relation between the air gaps of the said transducer heads, said cores and said spacing means forming a substantially planar surface common to all of said cores and said spacing means and having said air gaps formed therein, said surface being in predetermined relation to said magnetic recording medium with each of the air gaps formed therein in operative proximity to a single one of the tracks of said magnetic recording medium at any specific time.

20. A storage arrangement comprising, in combination, a rotatable magnetic recording medium; a magnetic tape; one of said magnetic recording medium and said magnetic tape having recording thereon different data items representing selected characters and digits and having recorded thereon a plurality of synchronizing signals; and transfer means for the selective simultaneous transfer of data items and synchronizing signals from said one of said magnetic recording medium and said magnetic tape to the other of the said magnetic recording medium and the said magnetic tape.

21. A storage arrangement comprising, in combination, a rotatable magnetic recording medium; a magnetic tape; one of said magnetic recording medium and said magnetic tape having recorded thereon different data items representing selected characters and digits and having recorded thereon a plurality of synchronizing signals; and transfer means for the selective simultaneous transfer of data items and synchronizing signals from said one of said magnetic recording medium and said magnetic tape to the other of the said magnetic recording medium and the said magnetic tape, said transfer means including sensing and recording means positioned in operative proximity with said magnetic recording medium, sensing and recording means positioned in operative proximity with said magnetic tape, connecting means connecting the sensing and recording means of said magnetic recording medium with the sensing and recording means of said magnetic tape, and switching means selectively controlling the transfer of data items and synchronizing signals from selected ones of said sensing and recording means to selected others of said sensing and recording means.

22. A storage arrangement comprising, in combination, a rotatable magnetic recording medium having a plurality of tracks therein spaced from and parallel to each other; a magnetic tape having a plurality of tracks therein spaced from and parallel to each other; one of said magnetic recording medium and said magnetic tape having recording thereon different data items representing selected characters and digits and having recorded thereon a plurality of synchronizing signals; and transfer means for the selective simultaneous transfer of data items and synchronizing signals from said one of said magnetic recording medium and said magnetic tape to the other of the said magnetic recording medium and the said magnetic tape, said transfer means including sensing and recording means positioned in operative proximity with said magnetic recording medium, sensing and recording means positioned in operative proximity with said magnetic tape, connecting means connecting the sensing and recording means of said magnetic recording medium in parallel with the sensing and recording means of said magnetic tape in a manner whereby said sensing and recording means of said magnetic record medium and said sensing and recording means of said magnetic tape are adapted to transfer data items and synchronizing signals in parallel therebetween, and switching means selectively controlling the transfer of data items and synchronizing signals from selected ones of said sensing and recording means to selected others of said sensing and recording means.

23. A storage arrangement comprising, in combination, a rotatable magnetic recording medium; having a plurality of tracks therein spaced from and parallel to each other; a magnetic tape having a plurality of tracks therein spaced from and parallel to each other; one of said magnetic recording medium and said magnetic tape having recorded in a track thereof different data items representing selected characters and digits and having a recorded in another track thereof a plurality of synchronizing signals; and transfer means for the selective simultaneous transfer of data items and synchronizing signals from said one of said magnetic recording medium and said magnetic tape to the other of the said magnetic recording medium and the said magnetic tape, said transfer means including sensing and recording means positioned in operative proximity with said magnetic recording medium, sensing and recording means positioned in operative proximity with said magnetic tape, connecting means connecting the sensing and recording means of said magnetic recording medium in parallel with the sensing and recording means of said magnetic tape in a manner whereby said sensing and recording means of said magnetic record medium and said sensing and recording means of said magnetic tape are adapted to transfer data items and synchronizing signals in parallel therebetween, and switching means selectively controlling the transfer of data items and synchronizing signals from selected ones of said sensing and recording means to selected others of said sensing and recording means.

24. A storage arrangement comprising, in combination, a magnetic drum having a plurality of tracks therein spaced from and parallel to each other, said magnetic drum having recorded thereon different data items representing selected characters and digits and having recorded therein a plurality of synchronizing signals; a magnetic tape having a plurality of tracks therein spaced from and parallel to each other; and transfer means for the selective simultaneous transfer of data items and synchronizing signals from said magnetic drum to said magnetic tape.

25. A storage arrangement comprising, in combination, a magnetic drum having a plurality of tracks thereon spaced from and parallel to each other, said magnetic drum having recorded thereon different data items representing selected characters and digits and having recorded thereon a plurality of synchronizing signals; a magnetic tape have a plurality of tracks therein spaced from and parallel to each other; and transfer means for the selective simultaneous transfer of data items and synchronizing signals from said magnetic drum to said magnetic tape, said transfer means including sensing means positioned in operative proximity with said magnetic drum, recording means positioned in operative proximity with said magnetic tape, connecting means connecting the sensing means of said magnetic drum with the recording means of said magnetic tape, and switching means selectively controlling the transfer of data items and synchronizing signals from selected ones of said sensing means to selected ones of said recording means.

26. A storage arrangement comprising, in combination, a magnetic drum having a plurality of tracks therein spaced from and parallel to each other, said magnetic drum having recorded thereon different data items representing selected characters and digits and having recorded thereon a plurality of synchronizing signals; a magnetic tape having a plurality of tracks therein spaced from and parallel to each other; and transfer means for the selective simultaneous transfer of data items and synchronizing signals from said magnetic drum to said magnetic tape, said transfer means including sensing means positioned in operative proximity with said magnetic drum, recording means positioned in operative proximity with said magnetic tape, connecting means connecting the sensing means of said magnetic drum in parallel with the recording means of said magnetic tape in a manner whereby said sensing means of said magnetic drum are adapted to transfer data items and synchronzing signals in parallel to said recording means of said magnetic tape, and switching means selectively controlling the transfer of data items and synchronizing signals from selected ones of said sensing means to selected ones of said recording means.

27. A storage arrangement comprising, in combination, a magnetic drum having a plurality of tracks therein spaced from and parallel to each other, said magnetic drum having recorded in a track thereof different data items representing selected characters and digits and having recorded in another track thereof a plurality of synchronizing signals; a magnetic tape having a plurality of tracks therein spaced from and parallel to each other; and transfer means for the selective simultaneous transfer of data items and synchronizing signals from said magnetic drum to said magnetic tape, said transfer means including sensing means positioned in operative proximity with said magnetic drum, recording means positioned in operative proximity with said magnetic tape, connecting means connecting the sensing means of said magnetic drum in parallel with the recording means of said magnetic tape in a manner whereby said sensing means of said magnetic drum are adapted to transfer data items and synchronizing signals in parallel to said recording means of said magnetic tape, and switching means selectively controlling the transfer of data items and synchronizing signals from selected ones of said sensing means to selected ones of said recording means.

References Cited by the Examiner

UNITED STATES PATENTS 2,540,654 2/1951 Cohen ----------- 340—172.5

OTHER REFERENCES

Publication: Harvard Computation Laboratory-Description of a Magnetic Drum Calculator XXV, Harvard University Press, Cambridge, Mass., 1952, 40 pages.

MALCOLM A. MORRISON, *Primary Examiner.*

WALTER W. BURNS, Jr., *Examiner.*